(12) United States Patent
Wu

(10) Patent No.: US 8,600,091 B2
(45) Date of Patent: Dec. 3, 2013

(54) ELECTRONIC DEVICE

(75) Inventor: Kuo-Hsiang Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 578 days.

(21) Appl. No.: 12/790,968

(22) Filed: May 31, 2010

(65) Prior Publication Data

US 2011/0075873 A1    Mar. 31, 2011

(30) Foreign Application Priority Data

Sep. 29, 2009   (CN) .......................... 2009 1 0307956

(51) Int. Cl.
*H04R 1/02* (2006.01)
(52) U.S. Cl.
USPC .......................................... 381/332; 381/333

(58) Field of Classification Search
USPC ......... 381/332, 333, 388, 152, 190, 191, 306;
361/683, 687, 679.06
See application file for complete search history.

(56) References Cited

U.S. PATENT DOCUMENTS

| | | | |
|---|---|---|---|
| 5,638,456 A * | 6/1997 | Conley et al. | 381/190 |
| 6,057,659 A * | 5/2000 | Akiyama et al. | 381/98 |
| 6,256,192 B1 * | 7/2001 | Shannon | 361/679.06 |
| 6,580,799 B1 * | 6/2003 | Azima et al. | 381/333 |
| 6,842,338 B2 * | 1/2005 | Iredale | 361/679.06 |
| D611,046 S * | 3/2010 | Smith et al. | D14/331 |
| 2005/0147274 A1 * | 7/2005 | Azima et al. | 381/431 |

\* cited by examiner

*Primary Examiner* — Lun-See Lao
(74) *Attorney, Agent, or Firm* — Altis Law Group, Inc.

(57) ABSTRACT

An electronic device includes a main body, a speaker, and a supporting component. The speaker is disposed in the main body. The supporting component supports the main body. The supporting component combines with the main body, and a flat surface connected between the main body and the supporting component to form a triangular resonant space for the speaker.

18 Claims, 3 Drawing Sheets

ELECTRONIC DEVICE

BACKGROUND

1. Technical Field

The present disclosure relates to electronic devices, and particularly to an electronic device with a speaker.

2. Description of Related Art

Nowadays, a portable electronic device, such as a notebook computer, or a DVD player, often includes a speaker to reproduce sounds. The portable electronic device commonly includes a main body, a lid rotatably connected to the main body, and two speakers disposed in the main body.

The main body includes a central processor for processing requests of users and acquiring results corresponding to the requests. The lid includes a display apparatus for displaying the processing results to the users. The upper surface of the main body defines holes. The two speakers are disposed on the left side and the right side of the main body respectively, and sound reproduced by the two speakers emits through the holes.

As portable devices are further miniaturized and more functions are added, the amount of space available for speakers becomes very limited, limiting improvements to sound quality. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
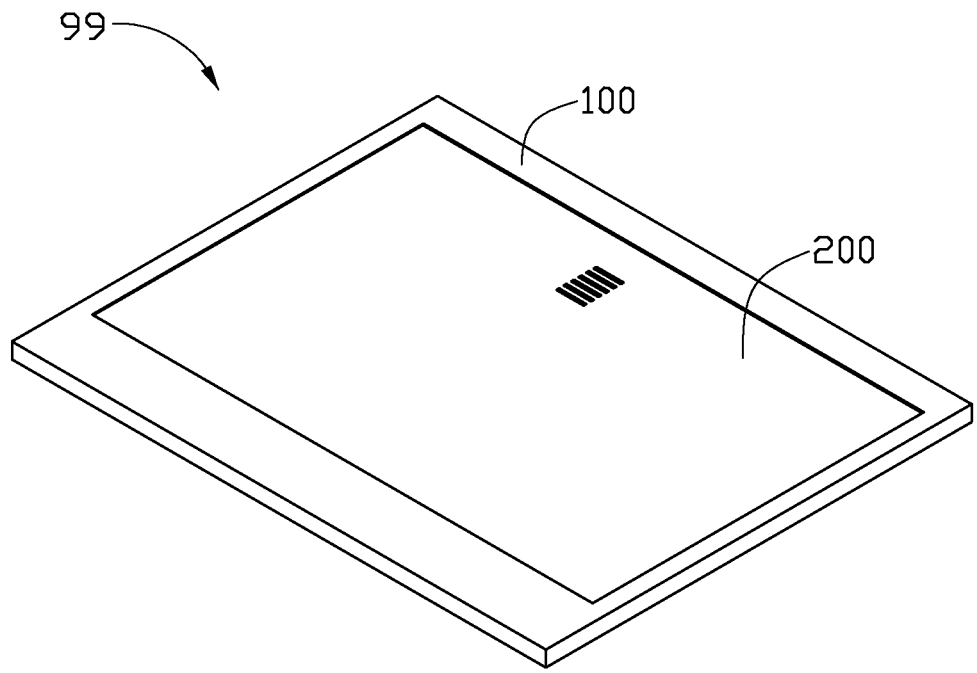
FIG. 1 is a perspective view of an electronic device in accordance with an exemplary embodiment.
Figure 2:
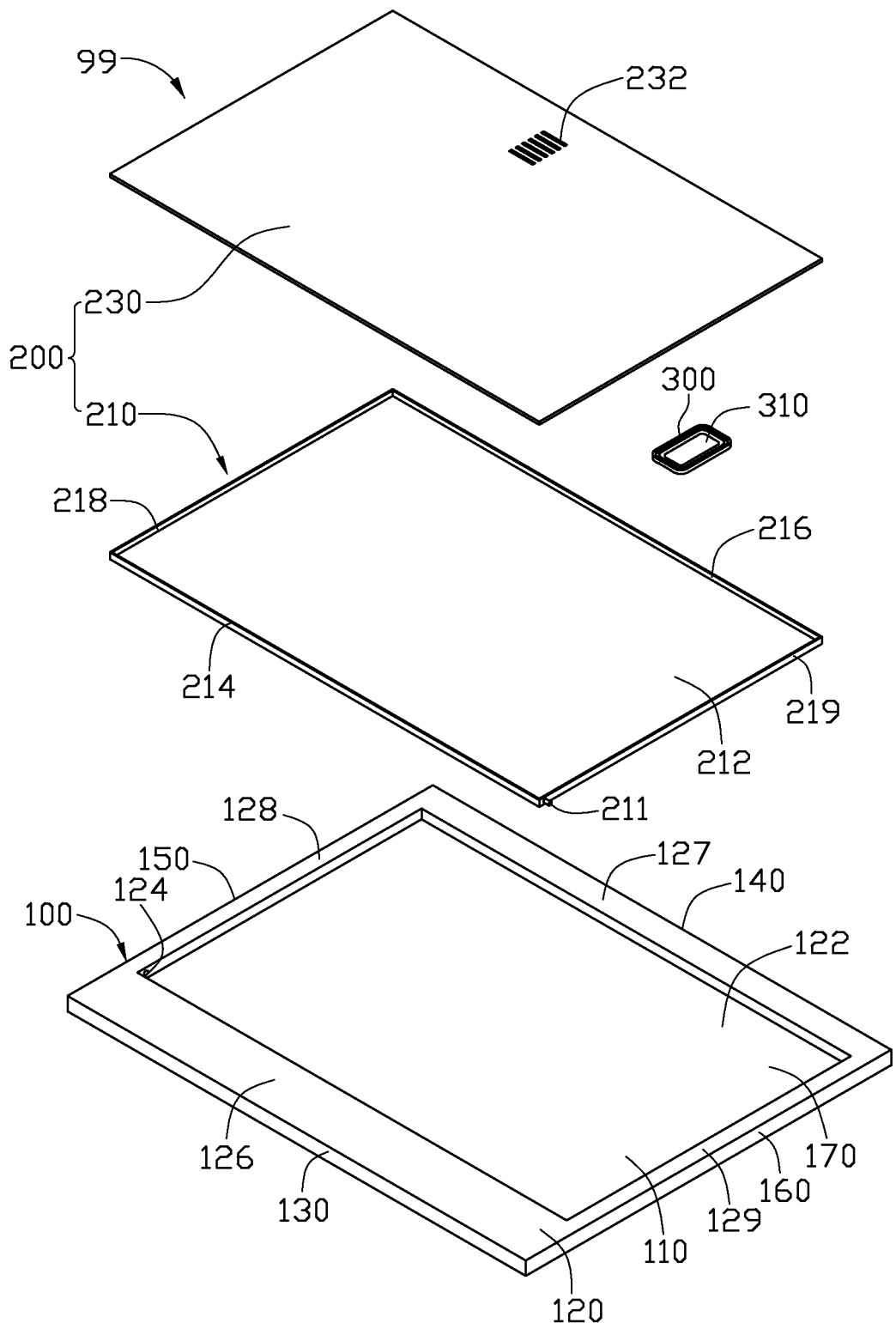
FIG. 2 is an exploded view of the electronic device of FIG. 1.

Referring to FIGS. 1 and 2, an electronic device 99 includes a main body 200, and a lid 100 rotatably connected to the main body 200, a speaker 300 disposed in the main body 200, and a supporting component 126. The electronic device 99 may be a notebook computer or a DVD player. The main body 200 includes a central processor for processing requests of users and acquiring results corresponding to the requests. The lid 100 include a display apparatus for displaying the processing results to the users.

In the embodiment, the supporting member 126 is formed on the lid 100, and coplanar with the lid 100. The lid 100 includes a first panel 110, a second panel 120, and a first sidewall 130, a second sidewall 140, a third sidewall 150, and a fourth sidewall 160 connecting the first panel 110 to the second panel 120 and all cooperating to form a receiving space 170 for the display apparatus. The second panel 120 defines an opening 122 communicating with the receiving space 170 to expose the display apparatus.

The second panel 120 includes a first beam 127, a second beam 128, and a third beam 129. The supporting component 126, the first beam 127, the second beam 128, and the third beam 129 are substantially perpendicularly connected to inner sides of the first sidewall 130, the second sidewall 140, the third sidewall 150, and the fourth sidewall 160 respectively and are interconnected to form the opening 122.

The second beam 128 and the third beam 129 each define a shaft hole 124 at the side of the supporting component 126. The two shaft holes 124 communicate with the opening 122.

The main body 200 is received in the opening 122, and coplanar with the supporting component 126. The main body 200 includes a housing 210 rotatably connected to the second panel 120 of the lid 100, and a rectangular first base sheet 230 fastened to the housing 210.

The housing 210 includes a rectangular second base sheet 212 covering on the first panel 110 of the lid 100, a first rim 214, a second rim 216, a third rim 218, and a fourth rim 219 substantially perpendicularly extending from four edges of the second base sheet 212 and connecting to the first base sheet 230. The first rim 214, the second rim 216, the third rim 218, and the fourth rim 219 are adjacent to inner sides of the supporting component 126, the first beam 127, the second beam 128, and the third beam 129 respectively.

The first rim 214 is parallel to the second rim 216, and the third rim 218 is parallel to the fourth rim 219. Two shafts 211 substantially protrude from the third rim 218 and the fourth rim 219 at the side of the first rim 214 respectively. The two shafts 211 insert into the two shaft holes 124 to rotatably connect the main body 200 to the second beam 128 and the third beam 129 of the second panel 120.

The first base sheet 230 defines a plurality of sound holes 232 at the side of the second rim 216. The speaker 300 is located between the second base sheet 212 and the first base sheet 230, and faces the sound holes 232, thus sound reproduced by the speaker 300 can be easily heard through the sound holes 232. In other embodiments, the sound holes 232 and the speaker 300 may be located in the center of the first base sheet 230.

Figure 3:
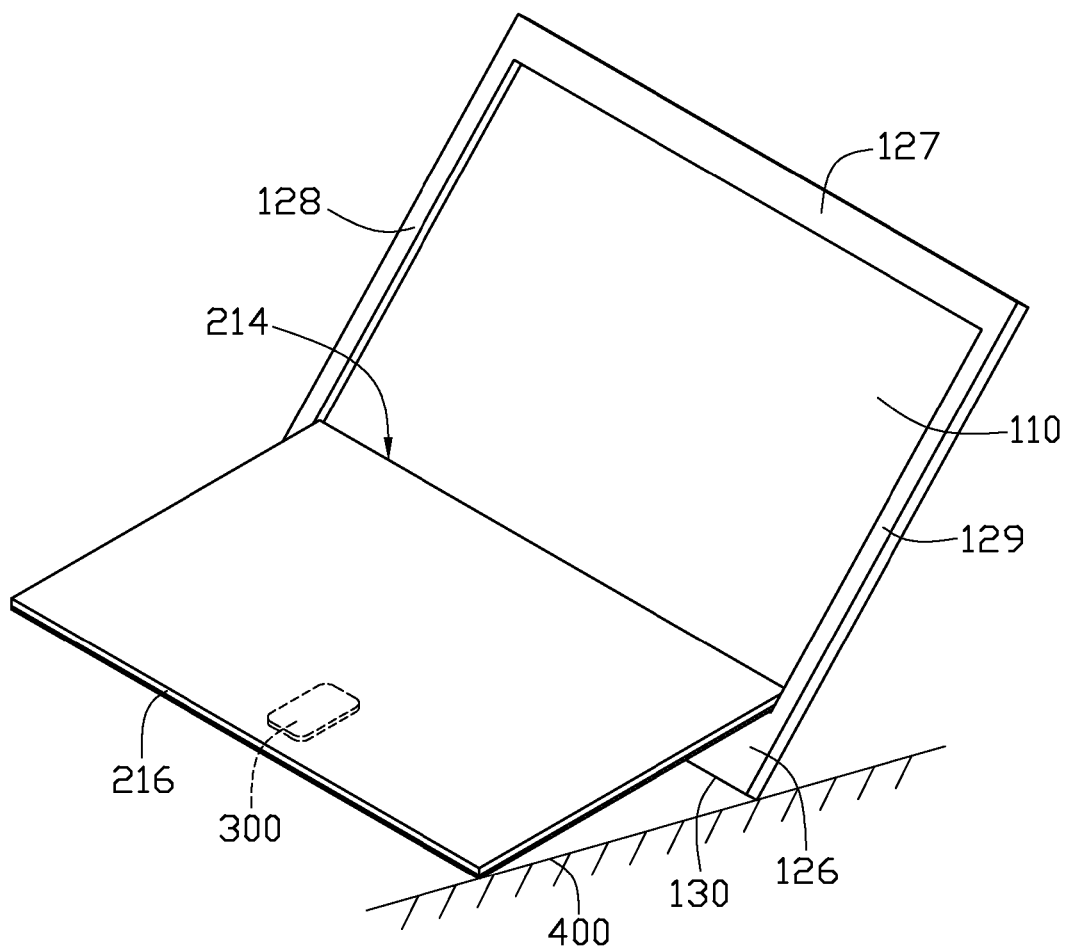
FIG. 3 is a schematic view of the electronic device of FIG. 1 in use.

Referring to FIG. 3, in use, the lid 100 rotates away from the main body 200 at the side of the second rim 216. The main body 200 is disposed between the lid 100 and the supporting component 126. The supporting component 126 combines with the first base sheet 230 and a flat surface 400, connected between the second rim 216 and the first sidewall 130, to form a triangular structure, thus the supporting component 126 can stably support the first rim 214 of the main body 200 and the lid 100.

The flat surface 400 can support the electronic device 99 on any suitable supporting surface. The first base sheet 230, the supporting component 126, and the supporting surface combine to form a triangular resonant space for the speaker 300. Therefore, sound effect of the speaker 300 in the electronic device 99 is enhanced. In the embodiment, an angle defined by the first base sheet 230 and the supporting component 126 is in a range from 47 to 110 degrees.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
   a main body;
   a speaker located in the main body;
   a supporting component, and
   a lid rotatably connected to the main body, the lid comprising a first panel and a second panel; the second panel and the supporting component protruding from a side of the first panel to define an opening that is surrounded by the second panel and the supporting component, the lid switching between a first state covering on the main body and a second state rotating away from the main body;
   wherein when the lid is in the first state, the main body is received in the opening; when the lid is in the second state, an end of the main body connected to the lid is raised and supported by the supporting component, a triangular resonant space for the speaker is formed by the supporting component and the main body.

2. The electronic device according to claim 1, wherein an angle defined by the main body and the supporting component is in a range from 47 to 110 degrees.

3. The electronic device according to claim 1, wherein the flat surface is connected between one end of the main body away from the supporting component and one end of the supporting component away from the main body.

4. The electronic device according to claim 1, wherein the main body comprises a housing and a first base sheet fastened with the housing, the first base sheet defining at least one sound hole, the speaker being located between the housing and the first base sheet, and sound reproduced by the speaker emitting through the at least one sound hole; the supporting component supporting the first base sheet, and combining with the first base sheet, and the sound hole faces the triangular resonant space.

5. The electronic device according to claim 4, wherein the housing comprises a second base sheet, a first rim and a second rim; the first rim and the second rim extending from opposite ends of the second base sheet and connecting with the first base sheet; the speaker being disposed between the first base sheet and the second base sheet; the supporting component supporting the first rim.

6. The electronic device according to claim 1, wherein the supporting component is coplanar with the lid.

7. The electronic device according to claim 1, wherein the second panel comprising a first beam, a second beam and a third beam; the supporting component, the first beam, the second beam and the third beam substantially perpendicularly connected to inner sides of the first sidewall, the second sidewall, the third sidewall, and the fourth sidewall respectively and are interconnected to form the opening.

8. The electronic device according to claim 1, wherein the speaker is located in the center of the electronic device.

9. The electronic device according to claim 1, wherein the main body seals the opening.

10. The electronic device according to claim 9, wherein a side of the second panel away from the first panel is coplanar with the a side of the supporting component away from the first panel.

11. The electronic device according to claim 1, wherein the supporting component rotates with the lid by an angle with respect to the main body.

12. An electronic device, comprising: a main body; a supporting component, and a lid rotatably connected to the main body to switch between a first state covering on the main body and a second state rotating away from the main body, the lid comprising a first panel and a second panel; the second panel and the supporting component protruding from a side of the first panel to define an opening that is surrounded by the second panel and the supporting component; and
   wherein when the lid is in the first state, the main body is received in the opening; when the lid in the second state, a first end of the main body is apart from the lid, an a second end opposite to the first end of the main body is raised and supported by the supporting component; the supporting component rotates with the lid by an angle with respect to the main body when the lid rotates away from the main body; and a speaker located in the main body, the triangular structure providing a resonant space for the speaker.

13. The electronic device according to claim 12, wherein a side of the supporting away from the first panel is coplanar with a side of the lid away from the first panel.

14. The electronic device according to claim 12, wherein the lid is in the second state, the supporting component combines with the main body, and a flat surface connected between the main body and the supporting component to form a triangular structure.

15. The electronic device according to claim 12, wherein when the lid is in the second state, an angle defined by the main body and the supporting component is in a range from 47 to 110 degrees.

16. The electronic device according to claim 12, wherein the main body seals the opening.

17. The electronic device according to claim 12, wherein the second panel comprises a first beam, a second beam and a third beam; the supporting component, the first beam, the second beam and the third beam are substantially perpendicularly connected end-to-end to form the opening.

18. The electronic device according to claim 13, wherein when the lid is in the first state, a side of the main boy away from the first panel is coplanar with a side of the second panel away from the first panel.

* * * * *